Oct. 7, 1958     K. G. KREUTER     2,855,484

THERMOSTAT

Filed March 5, 1957     5 Sheets-Sheet 1

INVENTOR.
KENNETH G. KREUTER
BY
Maurice A. Weikart
ATTORNEY

Oct. 7, 1958 K. G. KREUTER 2,855,484
THERMOSTAT
Filed March 5, 1957 5 Sheets-Sheet 3

INVENTOR.
KENNETH G. KREUTER
BY
Maurice A. Weikart
ATTORNEY

Oct. 7, 1958  K. G. KREUTER  2,855,484
THERMOSTAT
Filed March 5, 1957  5 Sheets-Sheet 4

INVENTOR.
KENNETH G. KREUTER
BY
Maurice A. Weikart
ATTORNEY

Oct. 7, 1958

K. G. KREUTER 2,855,484

THERMOSTAT

Filed March 5, 1957

INVENTOR.
KENNETH G. KREUTER

BY
Maurice A. Weikart
ATTORNEY

United States Patent Office 2,855,484
Patented Oct. 7, 1958

2,855,484

THERMOSTAT

Kenneth G. Kreuter, Goshen, Ind., assignor to Penn Controls, Inc., a corporation of Indiana Application March 5, 1957, Serial No. 643,981

20 Claims. (Cl. 200—138)

This invention relates generally to condition responsive control apparatus and in particular to thermostats of circular outer configuration having a convenient means for adjusting the control point of the thermostat and being adaptable to various heating, cooling and air-conditioning installations.

Present-day heating, cooling and air-conditioning installations are characterized by the many variations of arrangement of the heating and cooling sequence. Some installations provide heating only, some provide heating and cooling with a manual or automatic changeover between the two functions, other installations provide cooling only, and any of the above mentioned combinations may require that the evaporator fan or air-circulator be switched on manually, independently of the operation of the cooling system. To provide a suitable control or thermostat, available for adjustment and switching by the occupants of the area being air-conditioned, has, in the past, required that many separate thermostat models be made available by the thermostat manufacturer, each with a different internal circuit and with differing components.

The present invention contemplates the use of a basic cover, sub-base and base combination in which the base carries the thermally responsive element, its switching contacts and an appropriate thermometer and temperature scale, and the sub-base carries whatever manually operated switches are required and a conductor blank which, by striking from the blank certain portions, can be used for any of the various heating and cooling systems mentioned above.

An object of the present invention is to provide a thermostat, or control device, the basic internal circuitry of which permits easy adaptation to provide all the required thermostat models necessary for modern heating, cooling and air-conditioning systems.

A further object is to provide a thermostat of round or circular configuration in which the component parts are arranged to permit ease of assembly of the complete thermostat.

A further object is to provide a thermostat of circular configuration in which the control point of the device may be conveniently adjusted by manually rotating the outer rim of the assembled thermostat.

A further object is to provide a thermostat in which a frictional or slipping connection exists between the temperature scale pointer-arm and the thermal element adjusting member so that the arm and the member may be conveniently moved relative to each other to permit calibration of the pointer arm with the operating point of the thermally responsive element.

A further object is to provide an electrical control device of the magnetic snap-acting, double-throw type which requires use of only a single press-back blade.

A further object is to provide an electrical control device of the magnetic snap-acting type which utilizes a ceramic permanent magnet of generally square-prism configuration, and cooperating permeable pole-pieces to provide dual north-south pole magnetic circuits for the moveable armature.

Other objects will become apparent as the description proceeds with reference to the drawings in which.

Figure 1:
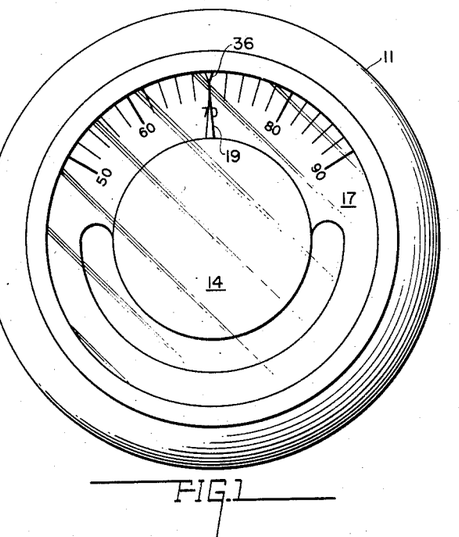
Figure 1 is a front view of the thermostat with the cover in place.
Figure 2:
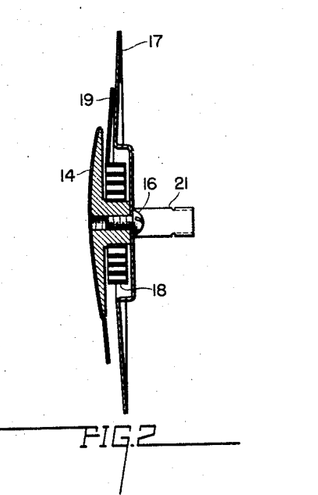
Figure 2 is a side sectional view of the thermometer assembly.
Figure 3:
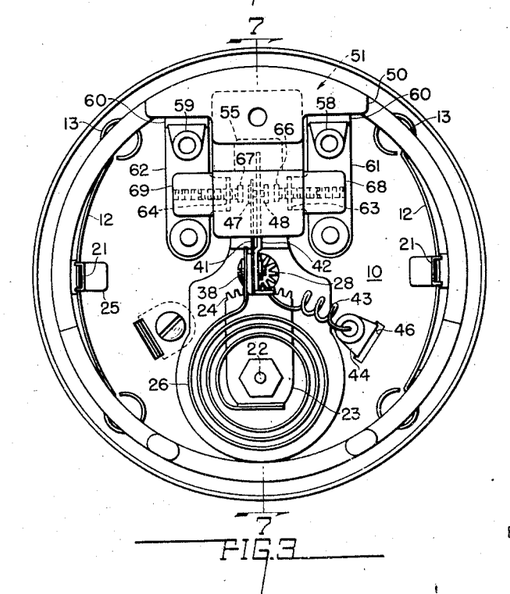
Figure 3 is a rear view of the thermostat with the sub-base removed so that the rear face of the thermostat base is exposed.
Figure 7:
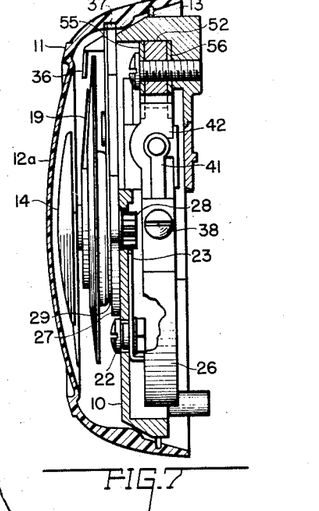
Figure 7 is a sectional view taken along line 7—7 of Figure 3 of the thermostat assembly omitting the sub-base and the switch marker plate.

Referring initially to Figures 1, 7, and 3, it will be noted that the thermostat there shown is generally circular convex in configuration and comprises a flanged base 10 which supports a circular concavo-convex cover member 11 by means of arcuate spring members 12 (Figure 3) which have portions 13 extending through slots in the base 10 and into an appropriate marginal inner groove in the cover 11 as may best be seen in Figure 7. Cover 11 may be formed of suitable plastic material and has a central transparent face 12a through which may be viewed a generally circular medallion 14 mounted by means of screws 16 (Figure 2) to a circular temperature scale carrying plate 17. Plate 17 has a rearwardly offset central portion which accommodates a bimetal thermometer member 18 formed in conventional spiral shape having its inner end fixed to the rearwardly extending boss on the member 14 and carrying at its free end a pointer 19 adapted to cooperate with the temperature indicia on the plate 17. Plate 17 is supported in overlying relation to the front face of the base 10 by means of two rearwardly extending legs 21 which extend through suitable openings 25 (Figure 3) in the base 10 and have their ends formed so as to provide suitable notches for engagement by the spring members 12 as may best be seen in Figure 3.

Figures 5, 6:
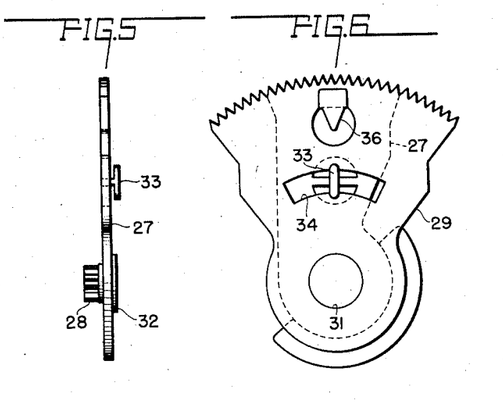
Figure 5 is a side view of the thermostat adjusting member.
Figure 6 is a front view of a pointer carrying blade which forms a part of the thermostat adjusting assembly.

Pivotally mounted on a stub shaft 22 extending from the rear face of the base 10 is a thermally responsive element mounting member 23 having a gear sector 24 formed at its upper end. The opposite end of member 23 has rigidly mounted thereon a thermally responsive member 26 which takes the form of a spiral bi-metal blade. An irregularly shaped adjusting member 27, shown in detail in Figures 5, 6, and 7, has extending from its rear face a pinion gear 28 which is rigidly supported on the member 27, the upper marginal edge of member 27 being formed to provide an arcuate gear sector. The pointer carrying plate or arm 29 has an opening 31 therein adapted to receive the circular boss 32 in the member 27. A deformable tab 33 carried by the member 27 is adapted to be accommodated in an arcuate slot 34 in the member 29. As may best be seen in Figure 6 plate 29 carries at its upper end a geared sector which coincides with the geared sector carried by the member 27. It will be understood that with members 27 and plate 29 assembled as shown in Figure 6, they will be capable of relative movement resisted by the frictional forces created as tab 33 traverses the slot 34 and with the limits of their relative movement being established by the ends of the slot 34. As may best be seen in Figure 7 this subassembly is held in overlying relation to the front face of the base 10 with the gear 28 extending freely through an appropriate central opening in the base 10. In such position the gear 28 is in engagement with the gear sector 24 formed on the member 23 and, further, when this subassembly is in place, a pointer 36, offset slightly from the front face of blade 29 and carried thereby, is adapted to cooperate with the temperature indicia carried by the plate 17. As may best be seen in Figure 7 the inner surface of the cover 11 has formed therein a toothed annular portion 37 which is adapted to mesh with the geared sectors formed at the upper extremities of both member 27 and plate 29.

Figure 4:
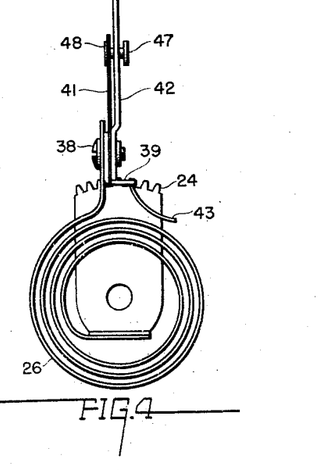
Figure 4 is a detail view of the bi-metal and contact assembly.
Figures 13, 14:
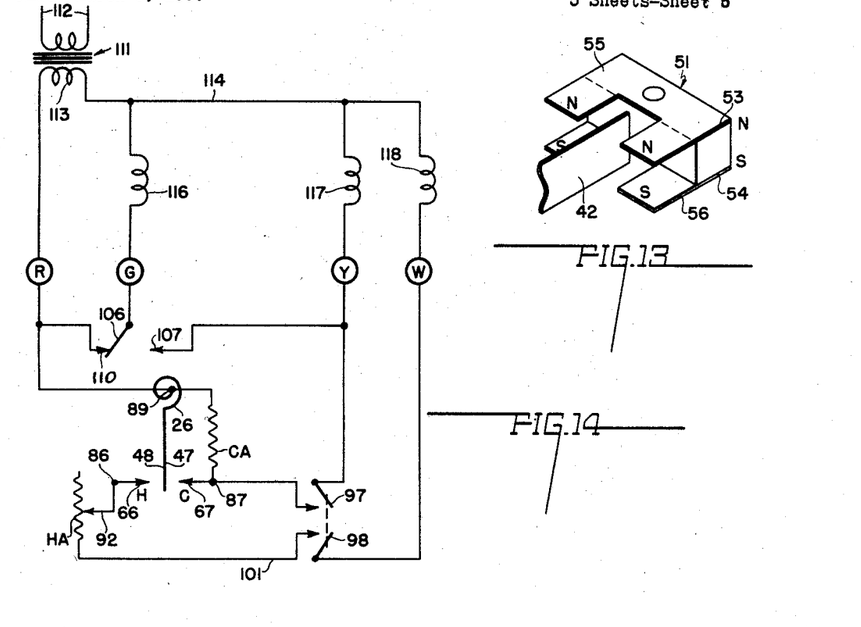
Figure 13 is a detail view of the magnet and armature forming a part of the thermostat contact assembly.
Figure 14 is a schematic showing of a control circuit for heating and cooling operation with the thermostat utilizing the sub-base adaptation shown in Figure 8.

Referring now principally to Figures 3, 4, and 7 the contact assembly, carried in part by the bi-metal 26 by means of screws 38 includes a conductor lug 39, a pressback blade 41 and an armature member 42, lug 39 being electrically connected by means of pigtail lead 43 to a terminal member 44 which extends into a slot 46 in the base 10. The free end of the blade 41 carries rigidly secured thereto a contact stud having contact surfaces 47 and 48. The intermediate portion of the contact stud extends freely through an appropriate opening in the armature member 42. The free end of armature 42 is adapted to co-operate with a permanent magnet assembly 51 which is carried within a shoulder 50 formed in the rear face of the base member 10. The magnet assembly 51 is shown in detail in Figure 13 and comprises a ceramic permanent magnet 52 of generally square-prism configuration magnetized in a direction perpendicular to the plane of two of its opposed faces 53 and 54, as indicated in Figure 13. Overlying the opposed faces 53 and 54 are U-shaped magnetically permeable plates 55 and 56 respectively, the free ends of the legs of plates 55 and 56 thus forming north and south magnetic poles which hold the armature member 42 in either of the extremities of its movement within the bight of U-shape plates 55 and 56. With the magnet arrangement shown in Figure 13 it will be evident that the single ceramic magnet 52 presents both north and south magnetic poles to the armature 42 at both extremities of its motion within the bight of the plates 55 and 56. Referring again to Figure 3, the base 10 carries contact plates 61 and 62 which have opposed upturned flanges 63 and 64 in which are threaded contact carrying screws 66 and 67 adapted to cooperate with moveable contacts 47 and 48. The upper ends of plates 61 and 62 are electrically connected to terminal members 58 and 59 which are similar to terminal member 44 and extend into appropriate slots 60 in the base 10. The pointer-carrying plate 29 and the adjusting member 27 form a convenient means for calibrating the pointer 36 with the operation of the bi-metal member 26. Such calibration may be carried out by placing the thermostat in, for example, a 70° ambient temperature, removing the cover 11, manually moving member 27 until the contacts 66—48 just close, then manually moving plate 29 until pointer 36 carried thereby indicates 70° on the temperature scale carried by plate 17. Replacing cover 11, with its toothed portion 37 mating with the corresponding portions on member 27 and plate 29, locks the pointer with reference to the thermostat adjustment so that manual rotation of the cover to alter the operation point of the thermostat will correspondingly move pointer 36 relative to the temperature indicating scale carried by plate 17.

Referring principally to Figures 8, 11, 12, and 14, the sub-base assembly will now be described. As may be seen in Figure 8, a disc-shaped sub-base 82 is removeably held by any suitable means within a switch marker plate 81. The sub-base 82 has a marginally flanged front face and carries three spaced openings 83 through which mounting screws (not shown) may extend for attaching the complete thermostat assembly to a wall mounting bracket of conventional type. A conductor blank 84 (Figure 11) is accommodated on the front face of the sub-base 82, and is provided with upstanding flanges 86, 87 and 88 which are received within the slots 60 and 46 respectively in the base 10, and thereby make electrical contact with terminal members 58, 59, and 44, respectively, when the sub-base is mounted in assembled relation with the base 10. The blank 84 also provides wiring terminals R, G, Y and W which are adapted to receive the proper control circuit wires which may be drawn through the opening 89 in the sub-base 82.

Figure 10:
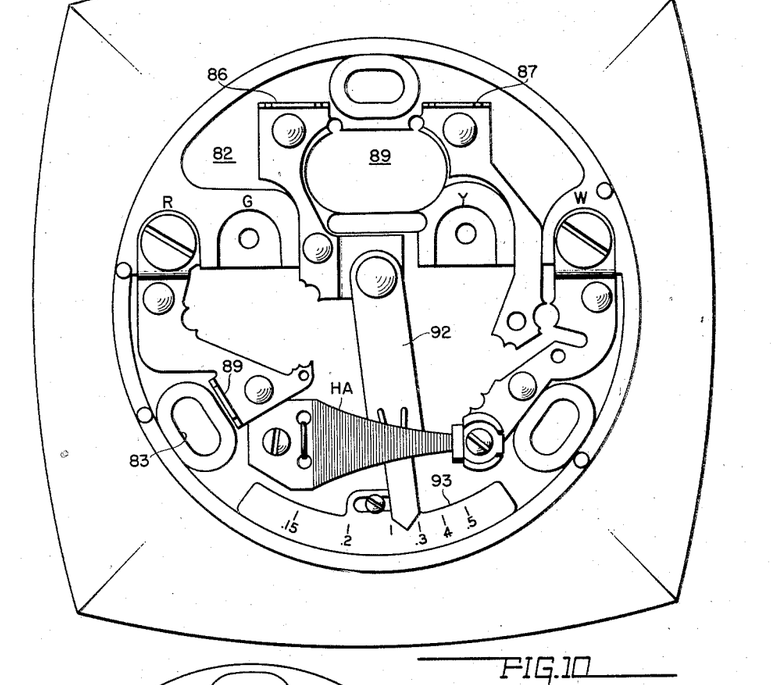
Figure 10 is a view similar to Figure 9 but showing the sub-base assembly adapted for "heating only" operation.
Figure 11:
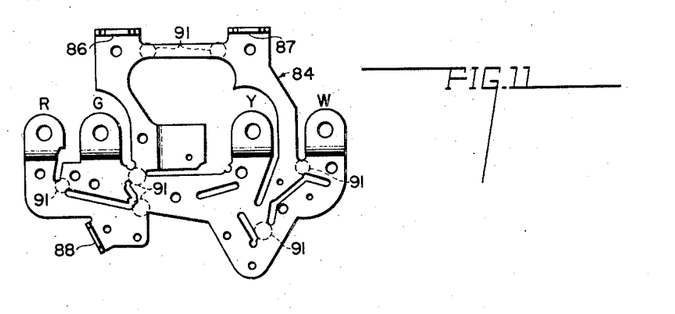
Figure 11 shows a plan view of the blank for the conductor plate which forms a part of the sub-base assembly.
Figure 12:
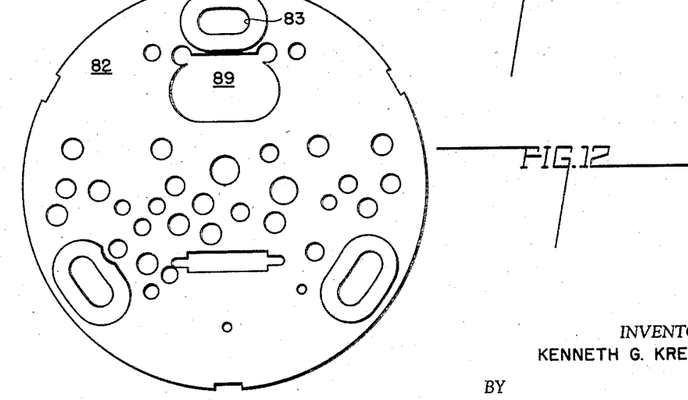
Figure 12 is a rear view of the sub-base, omitting the switch marker plate.

As will be evident from Figure 11, the blank 84 is formed with various slots and holes therein, some of these holes serving to accommodate rivets securing the blank 84 to the front face of the sub-base 82. When the blank 84 is so mounted, an appropriate fixture may be brought into proximity with the rear face of the sub-base 82 (Figure 12), the fixture carrying means for drilling or striking from the blank 84 certain of the portions of the blank 84 overlying certain of the holes in the sub-base 82. By proper choice of the portions of the blank 84 to be removed therefrom, it will be evident that the blank 84 may be made to provide various circuit configurations as required by thermostat models of varying complexity. The holes 91 indicated by broken lines in Figure 11 are opened in the blank 84 for all models of the thermostat and the correspondingly freed portions of the blank are removed, various other openings are made in the blank to provide the heating and cooling circuit shown in the sub-base of Figure 8, the cooling only circuit of Figure 9 and the heating only circuit of Figure 10. Any of these variations can be further modified by including or omitting a manual fan switch as will subsequently be described.

Returning to Figure 8, it will be noted that the sub-base 82 carries pivotally mounted thereon an adjustable heater wiper arm 92, having electrical connection with a portion of the conductor blank which forms the flange connector 86. Arm 92 adjustably cooperates with a conventional heat anticipating heater HA also carried by the sub-base 82, and, at its free end cooperates with a suitable indicating plate 93 also mounted on the sub-base 82. It will be understood that with the base 10 and its accompanying parts removed from the sub-base 82, the arm 92 may be manually moved over the heater HA to vary the heat output of heater HA and hence its anticipating effect on the bi-metal 26, or the arm 92 may be adjusted to provide a uniform heat output of heater HA for varying circuit currents, thus permitting the thermostat to be accommodated in control circuits of various types. A conventional cold anticipating heater CA is connected electrically between the portions of the conductor blank forming flange terminals 87 and 89, heater CA being non-adjustable.

Figure 8:
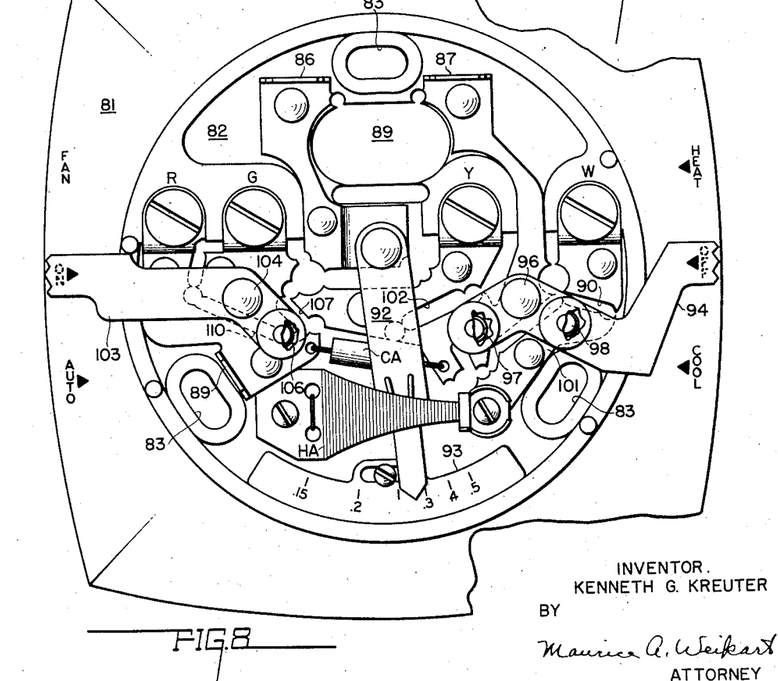
Figure 8 is a front view of the sub-base assembly showing the switching members and the switch marker plate.

The sub-base 82 also carries mounted thereon a selector switch operator member 94, formed of suitable electrical insulating material, pivoted at 96 and adapted to have one serrated end thereof extending beyond the margin of sub-base 82 and cover 11, this extending end co-operating with suitable "Heat," "Off" and "Cool" markings carried by the plate 81. At 97 and 98 the member 94 carries contact making metallic protrusions adapted to form convex electrically conducting surfaces on the underface of the member 94. When member 94 is moved toward "Heat" position, it will be evident that the contact 98 will detent in the opening formed by the slot 90 thus electrically joining the conductor blank portion 101 (having electrical connection with heater HA) and the terminal W. When contact 98 is in this position, since contact 97 is a somewhat greater distance from the pivot 96 than the contact 98, the contact 97 will be moved arcuately down the lower portion of the conductor blank forming terminal flange 87 but will not be moved into contact with the conductor blank portion 101 and will therefore have no switching function. When member 94 is moved from its position of Figure 8 toward "Cool" position, the contact 97 will be displaced so as to detent within the opening formed by the slot 102 and thus electrically connect the portion of the conductor blank forming the terminal flange 87 with the terminal Y. During this motion of the member 94 the contact 98 will remain in contact with the conductor blank portion 101 and will thus perform no switching function. A fan switch selector member 103, formed of suitable insulating material, is pivotally mounted on the sub-base 82 at 104 and has a serrated end which extends beyond the sub-base 82 and cover 11, this extending end cooperating with suitable "On" and "Auto" markings on the plate 81. At 106 the member 103 carries a metallic convex contact surface similar to contacts 97 and 98 previously referred to. It will be understood that member 103 has two positions "On" and "Auto" (abbreviation for automatic) and that, as shown in Figure 8, member 103 is in its uppermost position. In the position of Figure 8, the contact 106 bridges the slot 110 formed between the portions of the conductor blank forming flange terminal 89 and the wiring terminal G so that these terminals are electrically connected. When member 103 is moved into "Auto" position, the contact 106 is displaced so as to then bridge the slot formed at 107 between the portions of the conductor blank forming wiring terminals G and Y so that these terminals are thus electrically connected.

Referring now to Figure 14, which illustrates a thermostat carrying the sub-base of Figure 8 integrated into a control circuit for a heating and cooling installation, a transformer 111 has input leads 112 and a secondary winding 113. Winding 113 is connected by means of a wire 114 to an evaporator fan relay coil 116, a cooling means relay coil 117 and a heating means relay coil 118. It will be understood that, when energized, the relay coils 116, 117 and 118 place in operation respectively the evaporator fan for the cooling means, the cooling means itself (which may take the form of a conventional mechanical refrigeration apparatus) and the heating means which may take the form of a conventional gas or oil burner, and it will be further understood that the output of these components affects the temperature of the room or enclosure in which the thermostat is located. The side of the secondary 113 opposite to that previously referred to, the relay coil 116, the relay coil 117, and relay coil 118 are respectively connected by suitable wiring to the terminals R, G, Y, and W which are shown in their actual location in the thermostat assembly in Figure 8.

The previously described segments of the conductor blank 84 serve to connect terminal R with bimetal 26 by means of flange terminal 89, and terminal R is further connected to a switch formed by slot 110 and the bridging contact surface 106. Terminal G is similarly connected to the just mentioned switch and through the switch formed by the slot 107 and the contact surface 106 to the terminal Y. Terminal W is connected by the appropriate conductor blank portion to the switch formed by the contact surface 98 and conductor portion 101. The conductor blank portion forming terminal Y is also connected through the switch formed by contact 97 bridging the appropriate slot to the flange terminal 87.

With the selector members 94 and 103 in the positions shown in Figure 8, the circuit will be as shown in Figure 14. Under these conditions, with the member 103 in "On" position the switch formed at slot 110 will be closed and the evaporator fan relay will be energized causing the fan to operate continuously to move air through the room or enclosure in which the thermostat is located. Since member 94 is in "Off" position the aforementioned switches formed at contacts 97 and 98 will both be open. The cooling plant relay coil 117 and heating plant relay coil 118 will thus be de-energized independently of whether bimetal 26 has closed its contacts 48—66 calling for operation of the heating means or contacts 47—67 calling for operation of the cooling means.

If member 94 is now moved to "Heat" position, the switch formed at contact 98 will be closed and the heating relay coil 118 will be energized whenever bimetal 26 moves its contacts 48—66 into closed position. Heater HA will have its conventional heat anticipating effect on bimetal 26, the energizing circuit for relay coil 118 being from one side of secondary 113, conductor 114 to relay coil 118, thence to terminal W, through switch 98 to conductor blank segment 101, anticipating heater HA, contacts 66—48, through bimetal 26 and terminal 89 to terminal R and thence to the other side of secondary winding 113.

If member 94 is moved to "Cool" position, the switch formed at contact 98 will be opened and the switch formed at contact 97 will be closed, thus de-energizing the heating means relay 118 and placing energization of the cooling means relay coil 117 under control of bimetal 26 through its contacts 47—67. Anticipating heater CA will have its conventional anticipating effect (tending to move contacts 47—67 into closed position each time they are opened), the energizing circuit for relay coil 117 being from one side of secondary 113, through wire 114 to coil 117, thence to terminal Y, by means of the appropriate conductor blank segment to the switch formed by contact 97, thence to flange terminal 87, through contacts 67–47, bimetal 26 and terminal 89 to terminal R and thence to the opposite side of secondary 113. From the foregoing it will be evident that by shifting selector switch member 94 into "Heat" or "Cool" positions the bimetal 26 will control the heating plant operation through its contacts 66—48 or the cooling plant operation through its contacts 67—47.

It will be noted that operation of the fan switch is independent of the position of member 94 and that with member 103 in the position of Figure 8, the fan relay coil 116 will be continuously energized. If it is desired to operate the fan intermittently, member 103 is moved to "Auto" position, closing the switch formed at slot 107 and opening the switch formed at slot 110; as may be seen in Figure 14, this results in fan relay coil 116 being energized through the thermostat contacts 47—67 and thus operated whenever the cooling plant is operated.

Figure 9:
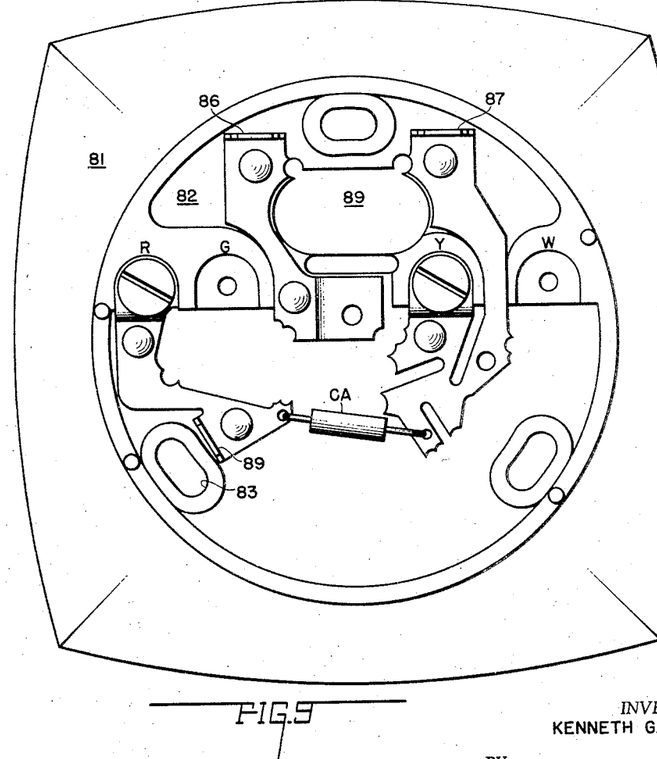
Figure 9 is a view similar to Figure 8 but showing the sub-base assembly adapted for "cooling only" operation.

Figures 9 and 10 illustrate two of the varying thermostat types which may be formed by varying the number and extent of the portions struck from the conductor blank 84. In Figure 9 the sub-base omits the fan switch and the heating-cooling selector switch and, when assembled with the thermostat base 10 and its accompanying parts, is adapted for use as a cooling thermostat only. It will be noted that the configuration of the conductor blank 84 omits the anticipating heater HA and the terminals G and W. Figure 10 illustrates a sub-base which, when assembled with the thermostat base 10 and its accompanying parts is adapted for use as a heating thermostat only. The configuration of the conductor blank omits the cold anticipating heater CA, the terminals G and Y, the fan switch and the heating-cooling selector switch.

From the foregoing it will be evident that the present invention provides a thermostat which has a unique operating point adjustment means permitting manual movement of the thermostat cover 11 to set the control point of the thermostat, further that the present invention provides a unique permanent magnet arrangement for obtaining snap-operation of the thermostat contacts, and that by means of a conductor blank and sub-base assembly in which varying portions of the conductor blank may be struck or removed therefrom various thermostat requirements may be met by providing several thermostat models having a maximum interchangeability of parts. Since the basic parts may be easily finished or adapted to any one of the several thermostat models which may be required, the problems of manufacture and inventory are obviously minimized.

The foregoing has described a preferred embodiment of the invention, modifications may occur to those skilled in the art and it is to be understood that the scope of the present invention is to be limited only by the appended claims.

I claim:

1. A control device comprising a base and a sub-base, an electrical control element mounted on the base, electrical terminals mounted on said sub-base, separable connectors extending between said sub-base and said base electrically connected to said control element, and means for providing alternate circuit connections between said terminals and said connectors, said means comprising a conductor blank mounted on said sub-base and electrically connecting said terminals and said connectors, said blank being adapted to have portions struck therefrom leaving said blank with a configuration providing the desired circuit connection between said terminals and said connectors.

2. A control device comprising a base and a sub-base, a condition responsive electrical control element mounted on the base, electrical terminals mounted on said sub-base, separable connectors extending between said sub-base and said base electrically connected to said control element, and means for providing alternate circuit connections between said terminals and said connectors, said means comprising a conductor blank mounted on said sub-base and electrically connecting said terminals and said connectors, said blank being adapted to have portions struck therefrom leaving said blank with a configuration providing the desired circuit connection.

3. A control device comprising a base and a sub-base, a condition responsive electrical control element mounted on the base, said sub-base having a plurality of spaced holes therethrough, terminals mounted on said sub-base, connectors extending between said sub-base and said base electrically connected to said control element, and means for providing alternate circuit connections between said terminals and said connectors, said means comprising a conductor blank mounted on said sub-base in overlying relation to said spaced holes and adapted to have certain of the portions of said conductor blank which overlie said spaced holes struck therefrom leaving said blank with a configuration providing the desired circuit connection between said terminals and said connectors.

4. A control device comprising a planar mounting member formed of insulating material, said member having a plurality of spaced holes therethrough, a condition responsive electrical control element overlying said member, electrical terminals mounted on said member, and means for providing alternate circuit connections between said terminals and said control element, said means including a conductor blank mounted on said member in overlying relation to said spaced holes and adapted to have certain of the portions of said conductor blank which overlie said holes struck from the blank leaving the blank with a configuration providing the desired circuit connection.

5. A control device comprising a planar mounting member formed of insulating material, said member having a plurality of spaced holes therethrough, a condition responsive electrical control element overlying said member, electrical terminals mounted on said member, and means for providing alternate circuit connections between said terminals and said control element, said means including a conductor blank mounted on said member in overlying relation to said spaced holes and adapted to have certain of the portions of said conductor blank which overlie said holes struck from the blank leaving the blank with a configuration providing the desired circuit connection, and a manually operable switching member mounted on said element adapted, when manually operated, to bridge the gaps in said conductor blank left by certain of said struck out portions.

6. A control device comprising a base and a sub-base, a condition responsive electrical control element mounted on the base, electrical terminals mounted on said sub-base, separable connectors extending between said sub-base and said base electrically connected to said control element, and means for providing alternate circuit connections between said terminals and said connectors, said means comprising a conductor blank mounted on said sub-base and electrically connecting said terminals and said connectors, said blank being adapted to have portions struck therefrom leaving said blank with a configuration providing the desired circuit connection, and a manually operable switching member, mounted on said sub-base and having a portion extending beyond the margin thereof, said switching member being adapted, when manually operated, to bridge the gaps in said conductor blank left by certain of said struck out portions.

7. The method for forming alternate circuit networks connecting the input terminals and output terminals of a perforated control device panel comprising: mounting on the panel a conductor blank in overlying relation to the perforations in the panel, then striking from the blank certain of the portions of the blank which overlie the perforations to leave the blank in a configuration providing the desired circuit connections between said input and output terminals.

8. A control device comprising a generally disc-shaped mounting base, a condition responsive element mounted on the base, means for adjusting the response of said element to a predetermined value of said condition, said means comprising: an adjusting member pivotally mounted on said base, motion-transmitting means extending between said adjusting member and said condition responsive element, a cover member adapted to enclose said base and mounted thereon for manual rotational movement relative to the base, and mating abutments on said cover and said adjusting member for transforming manual rotational movement of said cover member into pivotal movement of said adjusting member.

9. A control device comprising a generally disc-shaped mounting base, a condition responsive element mounted on the base, means for adjusting the response of said element to a predetermined value of said condition, said means comprising: an adjusting member pivotally mounted on said base and having a portion extending substantially to the outer margin of said base, motion-transmitting means extending between said adjusting member and said condition responsive element, a cover member adapted to enclose said base and mounted thereon for manual rotational movement relative to the base, and mating abutments on the outer margin of said cover and the extending portion of said adjusting member for transforming manual rotational movement of said cover member into pivotal movement of said adjusting member.

10. A thermostat comprising a generally disc-shaped mounting base, a thermally responsive element mounted on the base, means for adjusting the response of said element to a predetermined temperature, said means comprising: an adjusting member pivotally mounted on said base, motion-transmitting means extending between said adjusting member and said thermally responsive element, a concavo-convex cover member adapted to substantially enclose said base and mounted on the outer margin thereof for manual rotational movement relative to the base, and mating abutments on said cover and said adjusting member for transforming manual rotational movement of said cover member into pivotal movement of said adjusting member.

11. A control device comprising a generally disc-shaped mounting base, a condition responsive element mounted on the base, means for adjusting the response of said element to a predetermined value of said condition, said means comprising: an adjusting member pivotally mounted on said base, motion-transmitting means extending between said adjusting member and said condition responsive element, a member adapted to encircle the outer margin of said base and mounted thereon for manual rotational movement relative to the base, and mating abutments on said member and said adjusting member for transforming manual rotational movement of said member to pivotal movement of said adjusting member.

12. A control device comprising a generally disc-shaped mounting base, a condition responsive element mounted on the base, means for adjusting the response of said element to a predetermined value of said condition, said means comprising: an adjusting member moveably mounted on said base and adapted to adjust the response of said condition responsive element upon movement of the adjusting member, an indicia-carrying plate supported on said mounting base, a pointer-carrying arm moveably mounted on said base with its pointer being adapted to cooperate with said indicia, a cover member adapted to substantially enclose said base and removeably mounted thereon for manual rotational movement relative to the base, and mating abutments on said cover, said pointer-carrying arm and said adjusting member for transforming manual rotational movement of said cover member into adjusting movement of said adjusting member and to correspondingly move said pointer with respect to said indicia.

13. A thermostat comprising a generally disc-shaped mounting base, a thermally responsive element mounted on the base, means for adjusting the response of said element to a predetermined temperature, said means comprising: an adjusting member pivotally mounted on said base having a portion extending to the outer margin of said base and adapted to adjust the response of said thermally responsive element upon movement of said adjusting member, a temperature scale-carrying plate supported on said base in overlying relation thereto, a pointer-carrying arm pivotally mounted on said base with its pointer being adapted to cooperate with said temperature scale and having a portion extending to the outer margin of said base, a concavo-convex cover member adapted to substantially enclose said base and removeably mounted thereon for manual rotational movement relative to the base, and mating abutments on said cover and the extending portions of said adjusting member and said arm for transforming manual rotational movement of said cover member into adjusting movement of said adjusting member and to correspondingly move said pointer over said temperature scale.

14. A thermostat as claimed in claim 13 having a frictional connection between said adjusting member and said arm permitting said arm to be manually moved relative to said adjusting member when said cover member is removed to thereby permit calibration of said pointer with the response of said thermally responsive element.

15. A thermostat comprising a generally disc-shaped mounting base, a thermally responsive element mounted on the base, means for adjusting the response of said element to a predetermined temperature, said means comprising: an adjusting member pivotally mounted on said base having a portion extending substantially to the outer margin of said base and adapted to adjust the response of said thermally responsive element upon movement of said adjusting member, a temperature scale-carrying plate supported on said base in overlying relation thereto, a thermometer supported by said plate having an indicator adapted to cooperate with said temperature scale, a pointer-carrying arm pivotally mounted on said base with its pointer being adapted to cooperate with said temperature scale and having a portion extending substantially to the outer margin of said base, a base-encircling member mounted on said base and adapted for manual rotational movement relative to the base, and mating abutments on said base-encircling member and the extending portions of said adjusting member and said arm for transforming manual rotational movement of said base-encircling member into adjusting movement of said adjusting member and to correspondingly move said pointer over said temperature scale.

16. In an electrical control device, a condition responsive element, a double-throw snap-acting contact assembly operated by said element, said assembly comprising: an armature bar moveable by said element and having a mounted end and a free end, a flexibel press-back blade carried by said bar and coextensive therewith, a contact stud carried by said blade and having contact surfaces at each of its ends, the intermediate portion of said stud extending freely through an opening in said armature bar, fixed contacts adapted to cooperate with said contact surfaces, and a permanent magnet adapted to cooperate with the free end of said armature bar.

17. In an electrical thermostatic control device, a bimetallic temperature responsive element, a double-throw snap-acting contact assembly carried by the bimetallic element, said assembly comprising: an armature bar rigidly mounted at one of its ends on said bimetallic element and moveable thereby in response to temperature changes, a flexible press-back blade mounted at one of its ends on said bar and coextensive therewith, a contact stud carried by said blade adjacent its free end, said stud having contact surfaces at each of its ends, the intermediate portion of said stud extending freely through an opening in said armature bar, fixed contacts adapted to cooperate with said contact surfaces, and a permanent magnet adapted to cooperate with the free end of said armature bar.

18. In an electrical control device, a condition responsive element, a snap-acting switch assembly operated by said element, said assembly including: a ceramic magnet of a generally square prism configuration magnetized in a direction perpendicular to the planes of two of its opposed faces, two U-shaped permeable members, one secured to each of said opposed faces and having their legs coextensive beyond the margin of said opposed faces, and an armature moveable by said condition responsive element within the bight of said U-shaped permeable members.

19. In an electrical control device, a condition responsive element, a snap acting switch assembly operated by said element, said assembly including: a magnetic member of a generally square prism configuration magnetized in a direction perpendicular to the planes of two of its opposed faces, two U-shaped magnetically permeable members, one secured to each of said opposed faces and having their legs coextensive beyond the margin of said opposed faces, and an armature movable by said condition responsive element within the bight of said U-shaped permeable members, said armature being thereby traversed by unidirectional magnetic lines of force at either extremity of its movement.

20. In an electrical control device, a condition responsive element, a snap acting switch assembly operated by said element, said assembly including: a magnetic member of a generally square prism configuration magnetized in a direction perpendicular to the planes of two of its opposed faces, two U-shaped magnetically permeable members, one secured to each of said opposed faces and having their legs extending beyond the margin of said opposed faces, and an electrical contact structure including an armature movable by said condition responsive element within the bight of said U-shaped permeable members, said armature being thereby traversed by unidirectional magnetic lines of force at either extremity of its movement.

References Cited in the file of this patent

UNITED STATES PATENTS

| | | |
|---|---|---|
| 2,066,511 | Arlt | Jan. 5, 1937 |
| 2,231,111 | Caldwell | Feb. 11, 1941 |
| 2,315,533 | Malone | Apr. 6, 1943 |
| 2,441,960 | Eisler | May 25, 1948 |
| 2,490,073 | Malone | Dec. 6, 1949 |
| 2,616,994 | Luhn | Nov. 4, 1952 |